United States Patent
Kageyama et al.

(10) Patent No.: US 6,253,128 B1
(45) Date of Patent: Jun. 26, 2001

(54) INTERFERENCE PREDICTION APPARATUS FOR UNMANNED VEHICLE

(75) Inventors: Masato Kageyama, Oyama; Yukio Okawa; Kazunori Kuromoto, both of Yokohama, all of (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 09/253,937

(22) Filed: Feb. 22, 1999

(51) Int. Cl.[7] .............................. G01C 22/00; G05D 1/00
(52) U.S. Cl. ............................ 701/23; 701/25; 701/26; 701/301; 180/168; 180/169; 340/902; 340/903; 340/436; 246/167 D
(58) Field of Search .................................. 701/23, 24, 25, 701/26, 200, 201, 202, 207, 208, 209, 210, 300, 301; 180/168, 169, 167; 246/63 R, 167 R, 178, 187 B, 167 D; 340/901–905, 435, 436, 438

(56) References Cited

U.S. PATENT DOCUMENTS

| | | | |
|---|---|---|---|
| 4,722,410 | * | 2/1988 | Melocik et al. ............. 180/169 |
| 4,809,178 | * | 2/1989 | Ninomiya et al. .......... 701/200 |
| 4,967,860 | * | 11/1990 | Kremser ..................... 180/169 |
| 5,002,145 | * | 3/1991 | Wakaumi et al. ........... 180/168 |
| 5,249,126 | * | 9/1993 | Hattori ........................ 701/27 |
| 5,377,106 | * | 12/1994 | Drunk et al. ................ 701/25 |
| 5,528,888 | * | 6/1996 | Miyamoto et al. ......... 56/10.2 F |
| 5,781,870 | * | 7/1998 | Okawa ........................ 701/25 |

* cited by examiner

Primary Examiner—Jacques H. Louis-Jacques
(74) Attorney, Agent, or Firm—Varndell & Varndell, PLLC

(57) ABSTRACT

Interference prediction apparatus is applied when an unmanned vehicle is guided within a course area based on travel position and course data, and comprises a device for inputting the form of the course area, a device for preparing course data, device for estimating error of travel position when the unmanned vehicle is operated according to course data, and a device for predicting interference between the unmanned vehicle and areas outside the course area on the basis of estimated error so that interference can be prevented when unmanned vehicles pass by each other.

9 Claims, 4 Drawing Sheets

WHEN NO INTERFERENCE OCCURS

WHEN INTERFERENCE OCCURS

INTERFERENCE PREDICTION APPARATUS FOR UNMANNED VEHICLE

TECHNICAL FIELD

The present invention relates to an apparatus for guiding unmanned vehicles.

BACKGROUND ART

Unmanned, off-road dump trucks (referred to below as unmanned dump trucks) are widely used in mines to release personnel from arduous labor, lower production costs, and to reduce fuel consumption.

These unmanned dump trucks are equipped with the following so as to automate their motion: a device for measuring travel position using dead reckoning and GPS, a storage device for storing course data, and a control device for controlling the movement of the unmanned dump truck based on the travel position and course data.

A widely used method for preparing course data is a teaching system wherein the unmanned dump truck is actually operated and its travel positions are stored.

The course data are generally prepared with a teaching system for recording the positions of the dump truck over time while the unmanned dump truck is actually operated.

The course data prepared by the teaching system show the conditions of actual vehicle travel. Consequently, the contents thereof include position data satisfying travel speed, acceleration and deceleration and the lateral acceleration, which were actually possible for the vehicle to run under the conditions of the course in that instance. Furthermore, the course data include elements which are difficult to find through automatic calculations, such as the appropriate deceleration for an anticipated curve or acceleration for an anticipated upward grade. Moreover, the teaching system is easy for an operator to understand, since the operator just drives the vehicle.

For these reasons, the procedure for preparing course data with a teaching system is widely used.

Meanwhile, the technique of combining the teaching system with an offline system of preparing the course on a computer, according to the complexity of the course, has also been proposed (Japanese Patent Laid-open No. 8-101712).

In this way, the teaching system handles simple portions, such as straight sections, offline and handles complex portions where interference is likely in the vehicle.

Course data prepared by the teaching show the path actually traveled by the unmanned dump truck.

However, the vehicle in operation may not necessarily travel on the same course that was taught as a result of errors in position measurement or errors in the control of the vehicle using the measured positions.

For this reason, there is a risk that the vehicle, which traveled in the course area during the teaching operation, may travel outside of the course area and have an accident while repeating the actual course.

During teaching, the operator may anticipate the errors when operating the vehicle, but this is certainly not a perfect system. Furthermore, when the vehicle must pass other vehicles or when the area traveled is narrow, it is a difficult job to perform teaching for anticipating errors during travel and for avoiding interference with other vehicles and areas outside the course area.

The present invention was made in view of these circumstances and it is an object of the present invention to provide an interference prediction apparatus for unmanned vehicles which can predict interference of an unmanned vehicle when the vehicle is guided by course data prepared through teaching or the like.

SUMMARY OF THE INVENTION

The first invention is an interference prediction apparatus for unmanned vehicles, which is applied to an unmanned vehicle guided through a course area on the basis of travel position and course data, comprising: means for inputting the form of the course area; means for preparing the course data; means for estimating error of travel position when the unmanned vehicle is traveling according to the course data; and means for predicting the interference of the unmanned vehicle with areas outside of the course area on the basis of the estimated error.

With the first invention, errors in travel position during the unmanned vehicle's travel according to the course data are estimated, and interference of the unmanned vehicle with areas outside the course area is predicted on the basis of this error.

Consequently, interference of the unmanned vehicle with areas outside the course area can be predicted before the unmanned vehicle actually travels according to the prepared course data. As a result, it becomes possible to take steps, such as changing the course data and reteaching, to avoid actual interference of the unmanned vehicle.

The second invention is an interference prediction apparatus for unmanned vehicles, which is applied to unmanned vehicles guided on the basis of travel position and course data on different lanes in a course area, comprising: means for inputting the form of the course area; means for preparing the course data; means for estimating error of travel position when one unmanned vehicle is traveling according to its course data, while estimating error of travel position when another vehicle is traveling according to its course data; and means for predicting interference of the unmanned vehicle with areas outside of the course area and the interference of the vehicle with the other vehicle on the basis of the estimated error values.

With this second invention, it is possible to predict the interference of a vehicle with areas outside the course area, as well as the interference of a vehicle with another vehicle when a plurality of unmanned vehicles are traveling within the course area at the same time.

In the third invention, the means for predicting interference in the first invention comprises: means for estimating the zone wherein the unmanned vehicle is located based on the width of the unmanned vehicle, the course data, and the estimated error; and means for determining that the edge of the course area is within the zone in which the unmanned vehicle is located.

With the third invention, the zone in which the unmanned vehicle is present is estimated and this zone is used as the standard for determining whether interference will occur.

In the fourth invention, the means for predicting interference in the second invention comprises: means for estimating the zones wherein each of the unmanned vehicles is present based on the width of each of the unmanned vehicles, the course data of each vehicle, and the estimated error; and means for determining whether the edge of the course area is within this zone wherein the unmanned vehicle is present and determining whether the zones overlap.

With the fourth invention, the zones wherein a vehicle and another vehicle are present are each estimated and interference between the vehicles and the edge of the course area is predicted on the basis of those zones, while interference between the vehicle and another vehicle is predicted on the basis of the zones.

In the fifth invention, the means for predicting interference in the first invention comprises: means for establishing the zone within the course area where positions in the course data may not be present, on the basis of the estimated error, the course area, and the width of the unmanned vehicle, and means for determining that positions in the course data are present within the zone.

With the fifth invention, the zone where the positions in the course data are not present within the course area is established, instead of the zone wherein the vehicle is located, and interference between the vehicle and the edge of the course area is predicted when positions in the course data are present in this zone.

In the sixth invention, the means for predicting interference in the second invention comprises: means for establishing the zone in the course area where positions in the course data for a vehicle may not be present, and the zone in the course area where positions in the course data for another vehicle may not be present, on the basis of the estimated error, the course area, the central position of the course area, and the widths of the vehicles; and means for determining that corresponding positions in the course data are present in the zones.

With the sixth invention, a zone wherein positions in the course data for a vehicle and another vehicle should not be present in the course area is established and interference is predicted when corresponding positions in the course data are present in this zone.

The seventh invention comprises the first or second invention and further comprises means for changing the course data to course data with which interference can be avoided, when interference is predicted by the means for predicting interference.

With the seventh invention, this course data can be changed to course data whereby interference can be avoided when it is predicted that the course data prepared will result in interference for the unmanned vehicle.

In the eighth invention, the means for preparing course data in the first or second invention comprises means for preparing teaching formulas to record vehicle positions when an operator actually drives the unmanned vehicle.

The course data prepared by the teaching system show the conditions of actual vehicle travel. Consequently, the contents thereof include position data satisfying travel speed, acceleration and deceleration and the lateral acceleration, which were actually possible for the vehicle to run under the conditions of the course in that instance. Furthermore, the course data include elements which are difficult to find through automatic calculations, such as the appropriate deceleration for an anticipated curve or acceleration for an anticipated upward grade.

The course data prepared with this teaching system is useful in estimating the error values in the first and second inventions.

DESCRIPTION OF THE EMBODIMENTS

Figure 1:
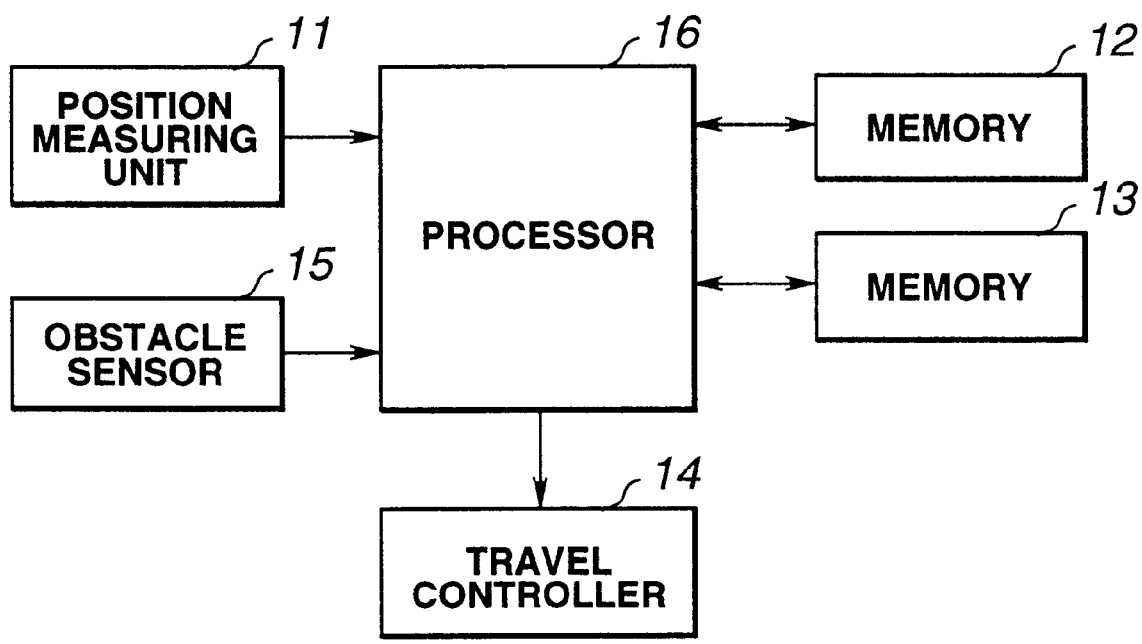
FIG. 1 is a block diagram of a guidance and control apparatus comprising interference prediction functions for unmanned vehicles.
Figure 3:
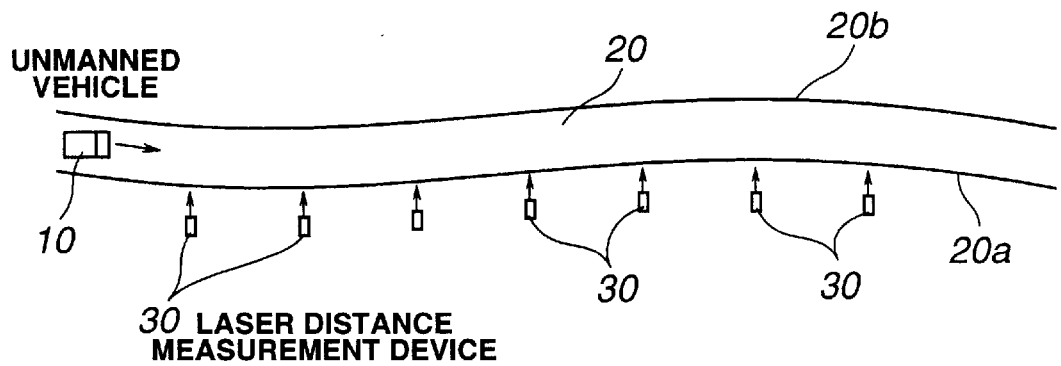
FIG. 3 is a schematic diagram showing an example of a course.

Embodiments for carrying out the present invention are explained below with reference to the accompanying drawings. The unmanned off-road dump truck 10 (referred to below as unmanned vehicle) shown in FIG. 3 is used in a mine to transport ore from a loading area to an unloading area. As shown in FIG. 1, the unmanned vehicle 10 comprises position measuring unit 11, memory unit 12 to store the course data discussed below, memory unit 13 to store the form of the course area discussed below, travel controller unit 14 to control the movement of the unmanned vehicle 10 on the basis of the course data and the location of the vehicle, and an obstacle sensor 15.

The position measuring unit 11 is provided the following, although not shown in the drawings, for measuring the position of the unmanned vehicle 10: a GPS (Global Positioning System), a tire revolution sensor to measurement the distance traveled, and a fiber-optic gyroscope for azimuth detection.

The unmanned vehicle 10 has a teaching mode to store the positions through which the vehicle has traveled. In this embodiment, an operator drives the vehicle manually and stores the path of travel.

Specifically, an operator actually drives the vehicle 10 along the course 20 illustrated in FIG. 3 and stores the path of movement in the memory unit 12 as a series of position data (course data).

Additionally, the unmanned vehicle 10 has a working mode. In this working mode, the travel controller unit 14 controls steering angle, acceleration, and braking so that the current coordinate axis of the unmanned vehicle 10 matches the speed and XYZ coordinates stored as course data.

[Factors causing errors in position measurement and travel control of the unmanned vehicle]

In the present embodiment, the position is measured using a combination of absolute position measurement with GPS and dead reckoning to estimate the position using tire revolutions and a fiber-optic gyroscope.

GPS measures the absolute position in space using differences in the time of arrival of radio waves received from GPS satellites carrying atomic clocks.

With GPS, when the receiver on earth maintains an atomic clock equivalent to those of the satellites, the position can be measured if there are three satellites to find the xyz degree of freedom. Actually, however, because a receiver does not have a clock that keeps time with sufficient accuracy, the position is found by receiving radio waves from four or ore satellites to find the four degrees of freedom of xyz and time t.

Moreover, signals from the GPS satellites designed for U.S. military use include error signals to intentionally reduce precision (selective availability). Also, the speed of the radio waves received from the GPS satellites changes due to the conditions in the ionosphere and troposphere; consequently the time of arrival thereof changes as well.

In order to eliminate these influences, GPS ground stations, called fixed stations, are established on the ground to confirm the measured positions. The system used thereby is called D-GPS (Differential GPS) and transfers data measured by these fixed stations to mobile stations.

The precision of position measurement can be improved by capturing a greater number of satellites and mounting the GPS antenna for receiving satellite signals in a higher position. However, a higher antenna results in greater changes to the reception position when the vehicle is inclined. The output of a sensor installed to detect vehicle inclination using the direction of gravity corrects the measurement error caused by the vehicle inclination.

Factors causing errors in GPS position measurement include the following: delays in transferring signals from the fixed stations to the mobile stations, a low number of visible satellites, satellite positions being grouped together, and multipassing of radio waves from the satellites caused by structures on the ground or other objects. Another factor is erroneous measurement of vehicle inclination by the sensor.

The number of satellites used in the measurement or a bad disposition of those satellites can also make GPS measurement less precise. Along with the position information, the GPS apparatus outputs the number of satellites, satellite positions, and so forth as an index for evaluating the precision of the measurement.

Moreover, position measurement is carried out only periodically with GPS. During the intervals where GPS measurements are not made, the position is measured using the dead reckoning.

In dead reckoning, the number of tire revolutions is used to find the amount of movement in the direction of vehicle travel. Slipping occurs between the tires and the surface; this slipping results in error. The amount of slipping increases when the brakes are applied, and especially during acceleration or deceleration.

The fiber-optic gyroscope used in dead reckoning measures the angular velocity as the vehicle turns by directing a laser beam from both ends of the plurality of optic fibers wound in a bundle and measuring the phase difference in rotated light output from the optic fiber.

The turning angle of the vehicle is found by time integration of the angular velocity. This angle includes optical and circuit errors to measure phase difference and integration error to measure turning angle.

Meanwhile, during travel control, the steering of the vehicle is controlled in order to minimize discrepancies between the predetermined course stored during teaching and the actual position measured by the position measuring unit 11. At this time, however, control errors occur caused by the disturbances such as the grade of the path or steering play or following delays of steering due to major changes in control command values caused by curves in the course.

[Measurement of position detection errors and travel control errors for the unmanned vehicle]

The travel control errors can be easily understood by comparing course data with data of position measurement during travel.

Determining the position measurement error requires a separate high precision and high speed position measurement system.

Lateral position displacement during travel is related to interference with other objects, in effect, to collisions. It is therefore sufficient to determine lateral precision. In the present embodiment, overall lateral displacement during travel is measured by mounting reflectors on the vehicle and lining up laser distance measurement device 30 at equal intervals along the course 20, as shown in FIG. 3.

The distance measurement device is designed to direct laser pulses with narrow beam widths toward an object and measure the distance to the object based on the time from emission of the beam until reception of the reflected laser pulse.

Distance measurement error is found by subtracting the travel control error at the same location as the measurement by the instrumentation from the measurement results of the distance measurement device.

The abovementioned error measurement is repeated for various levels of upwards and downwards grades, curves, load, and travel speed.

[Estimation of Position Detection Errors and Travel control Errors for the unmanned vehicle]

An error level can be estimated as follows on the basis of the data attained by the error measurements.

$$\text{err level} = f(\text{tilt}, R, \text{weight}, v) \ldots \quad (1)$$

where tilt is the angle of the grade, R is the turning radius of the vehicle in the curve, weight is the weight of the loaded vehicle (vehicle weight +load weight), v is the travel speed of the vehicle, and f is the function for finding the amount of error based on a table of the four arguments and the measurement results.

In order to have some leeway, err level is established as a distance of three times the standard deviation of the estimated error.

FIG. 3 illustrates the procedures for preparing course data.

In these procedures, the form of the course area is input (Step 100).

The unmanned vehicle 10 has an input mode for inputting the form of the course area. The form of the course area is input by operating the vehicle, as in teaching mode, with the unmanned vehicle set in this input mode.

Specifically, the current position is stored as measured by the position measuring unit 11 while the vehicle is in motion. In that case, as the unmanned vehicle 10 travels along the line 20*a* in the course area 20 shown in FIG. 3, the position stored is the position of the right front portion of the vehicle. As the vehicle travels along the line 20*b*, the position stored is the position of the left front end of the vehicle.

Moreover, the positions of the right and left ends may be measured using a calculation to substitute the positions of the left end and right end for the GPS measured position, or by manually or automatically changing the position at which the GPS antenna is mounted to the positions of the right and left ends.

In the case of regions in the course area which cannot be traversed (for example, regions where large boulders are present), the vehicle 10 is moved to those regions and the zone relative to that position is input manually.

The processor unit 16 shown in FIG. 1 stores the form of the course area, input as above, to the memory unit 13 shown in FIG. 1 as position data (course area data) comprising a sequence of points on a line showing the area.

Once the inputting of the form of the course area is complete, the vehicle is put in the teaching mode and is taught the course. In effect, the vehicle actually travels on the course 20 along which the vehicle is to be guided and stores its position from moment to moment in the memory unit 12 as course data comprising a sequence of coordinate points (Step 101).

Next, the processor unit 16 uses the formula (1) to estimate the position measurement error and travel control error for the unmanned vehicle 10 at each point of the course data attained by teaching (Step 102).

Specifically, the angle of the grade and the turning radius are calculated from the course data (grade angle can be calculated from GPS Z coordinate information). The weight can be attained by detecting the oil pressure in the hydraulic suspension or estimated based on the vehicle s direction of travel. Speed is attained from vehicle speed data included in the course data.

An estimate of the amount of error is attained based on these values and the formula (1). The course 20 shown in FIG. 3 runs between the loading area in the mine and the unloading area. The vehicle 10 therefore moves toward the loading area when empty and toward the unloading area when loaded with ore. Accordingly the vehicle weight can be estimated based on the vehicle s direction of travel.

Next, the processor unit 16 adds the estimated error value (err revel sic) and (vehicle width/2) to the course data and finds the lateral zone in which the unmanned vehicle 10 is located, with the standard being the position prescribed in this course data (Step 103). The processor unit determines whether the edge of the course area is located within that zone, in effect, whether the unmanned vehicle 10 crosses the edge of the course area (Step 104).

Figure 4:
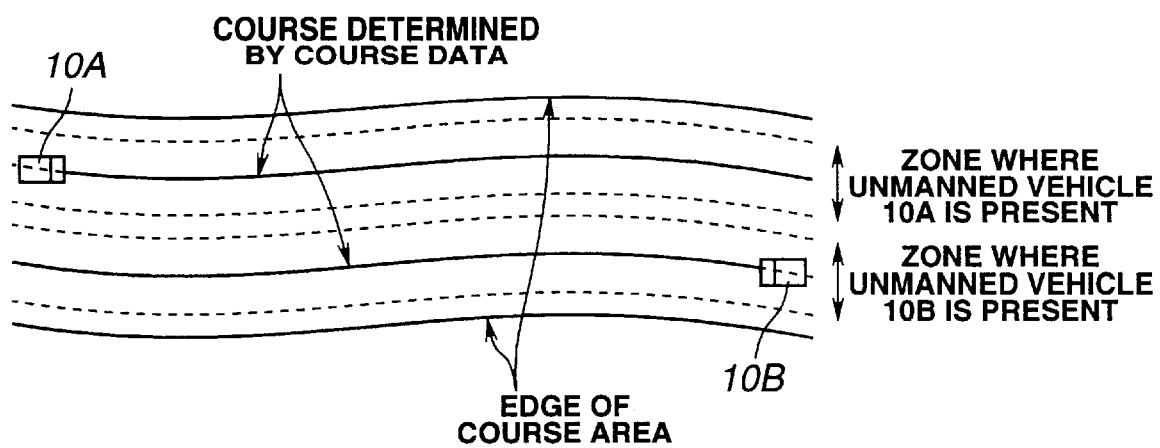
FIG. 4 is a schematic diagram showing another example of a course.

As shown in FIG. 4, however, this is different for a course where unmanned vehicles 10A, 10B pass by each other in the course area, in effect a course where a plurality of unmanned vehicles 10A, 10B are moving through the course area at the same time. The lateral zone in which the unmanned vehicle 10B is located, with the standard being the position in the course data, is estimated for the course data for vehicle 10A as well as for vehicle 10B.

In other words, the processor unit acquires the course data for other vehicles by means of a communications apparatus, not shown, and estimates the lateral zone in which the other vehicle 10B is present in Step 104.

Then, it is determined in Step 104 whether the zone in which the vehicle 10A is present overlaps with the zone in which the other vehicle 10B is present, in effect whether both vehicles 10A, 10B will interfere.

Figure 5:
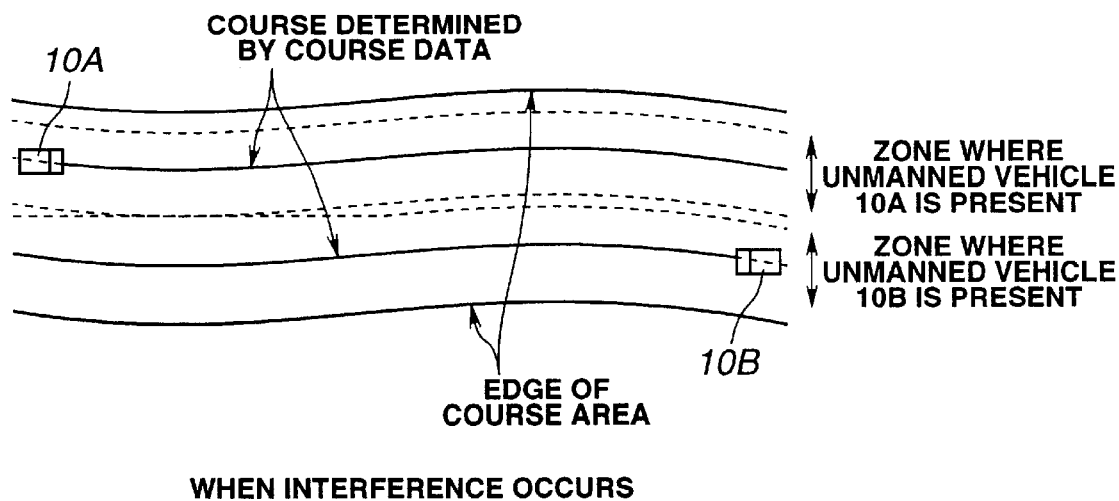
FIG. 5 is a schematic diagram showing the embodiment for setting the course when there is interference.

Moreover, FIG. 4 shows an example where the unmanned vehicles 10A, 10B do not interfere with each other. FIG. 5 shows an example where the two unmanned vehicles 10 do interfere with each other.

The course data is reconstituted as shown below (Step 105) when it is found in Step 104 that the edge of the course area is located within the zone or that the lateral zone of one vehicle overlaps with that of the other vehicle as shown in FIG. 5.
  a) Based on course data stored within a specified period, the point at which interference on the course is predicted is shifted in a direction such that interference is avoided, by the amount of interference, in a direction perpendicular to travel on the course.
  b) Based on the course data, the processor unit determines each point separated by a prescribed distance ahead of or behind the points at which the interference is predicted and connects those points and the shifted points by a splined curve.
  c) The processor unit projects the original instructed points, between the points separated by the prescribed distance to the front or back, on the splined curve and designates the projected points as the new instructed points to replace the original instructed points. The course data is reconstituted on the basis of these new instructed points. At this time, the angle of the vehicle in the new instructed points is established from the inclination of lines tangent to the instruction points on the splined curve.

The course data for which it was found in Step 104 that interference did not occur or the course data reconstituted in Step 105 is provided for actual travel. The vehicle 10 is steered along the course specified in the course data on the basis of the course data and the position of the vehicle 10 measured by the position measuring unit 11. At this time, interference between the vehicle 10 and areas outside the course area can be avoided.

Figure 2:
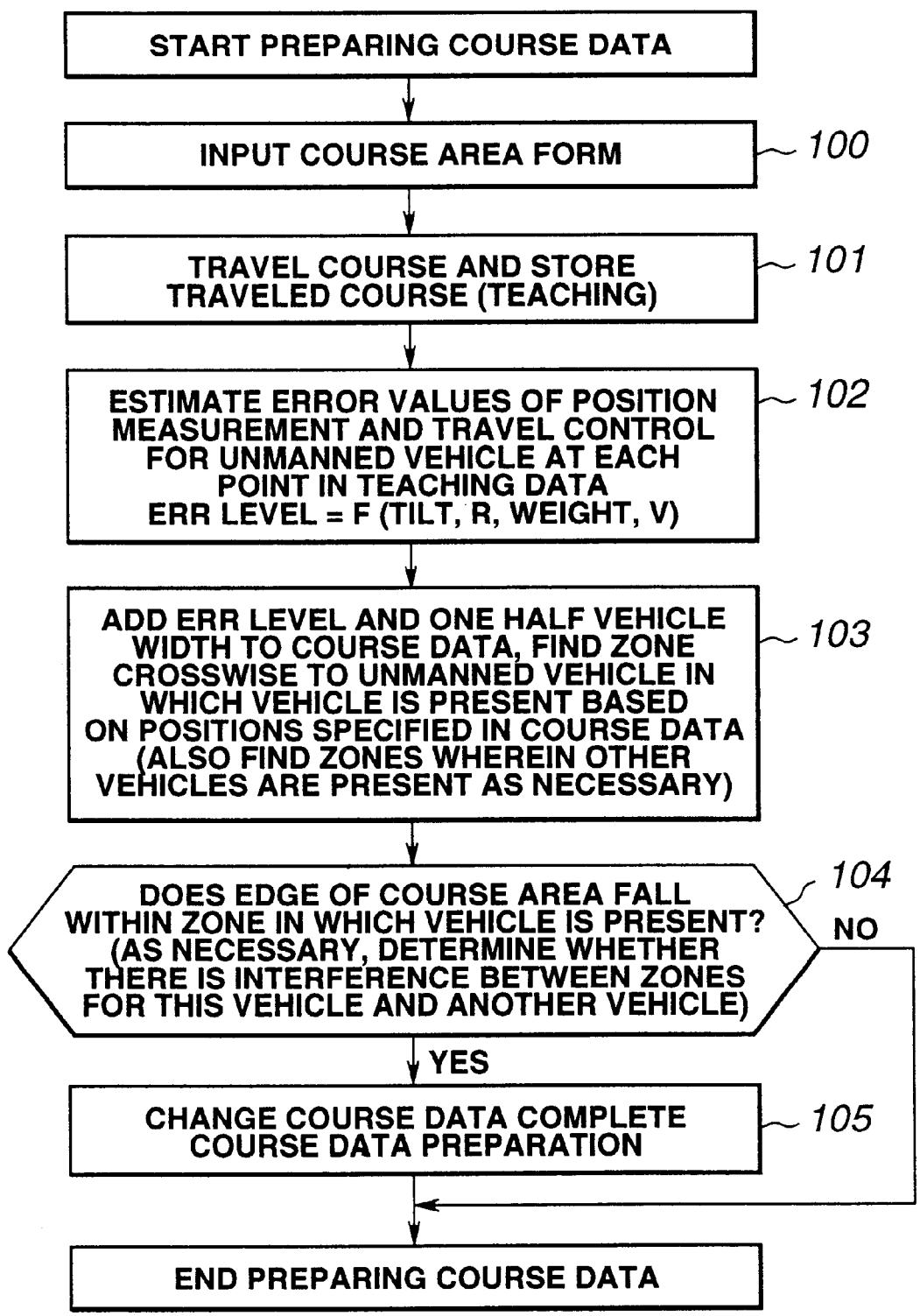
FIG. 2 is a flow chart showing the procedures for predicting interference of a vehicle.

Moreover, this is not shown in FIG. 2, but the original course data is considered to be no good when the shift is too large, or rather, the amount of interference is too great. In this case, the teaching operation is carried out once more and the interference check is carried out for the new course data attained thereby.

Figure 6:
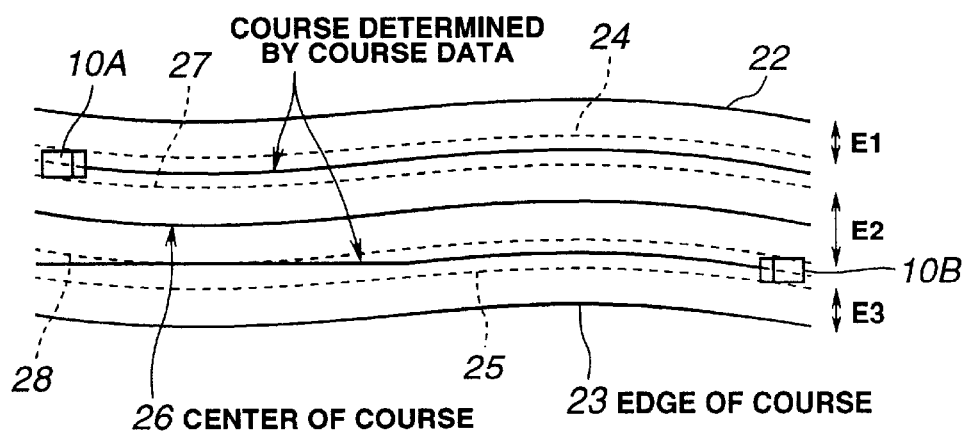
FIG. 6 is a schematic diagram showing another embodiment for checking interference.

In this embodiment, the zone wherein the vehicle is present is calculated using the course data and the interference of the course area and vehicle is determined on the basis of this zone. Oppositely, however, it is also acceptable to establish interference boundary lines at a distance of (estimated error+(vehicle width/2)) inwards from each edge of the course area, or shoulder, based on the course area data. The interference of the vehicle and course area is then determined as occurring when the position of the vehicle based on the course data falls between those lines.This This procedure may also be applied to a course as shown in FIG. 6 where vehicles pass each other.

In that case, interference boundary lines 24 and 25 are established at a distance (estimated error+(vehicle width/2)) inwards from the edges, or shoulders, 22 and 23 of the course area. Meanwhile, interference boundary lines 27 and 27 sic are established at a distance (estimated error+(vehicle width/2)) outwards from the center line 26 of the course.

When the course determined by the course data for one vehicle 10A falls within the zone El bounded by lines 22, 24, the vehicle 10A is found to interfere with one edge 22 of the course area. When the course based on the course data for both vehicles 10A, 10B falls within the zone E2 bounded by lines 27, 28, the vehicles 10A, 10B are found to interfere with each other.

Furthermore, when the course determined by the course data for the other vehicle 10B falls within the zone E3 bounded by lines 23, 25, the vehicle 10B is found to interfere with the other edge 23 of the course area.

Meanwhile, in this embodiment, the turning radii of curves and the angles of grades in the course determined by the course data are used as elements for estimating the amount of error, as shown by formula (1). However, when an edge of the course area is a shoulder of the course, the curve and angle of the grade of the edge of the course area may be used as the elements.

When the measurement results and amount of error are not influenced by grade, for example, it is acceptable to estimate error using only the turning radius of the curve. The amount of error may be estimated using the worst values for all conditions.

What is claimed is:

1. An interference prediction apparatus for unmanned vehicles, which predicts interference of an unmanned vehicle with areas outside of a course area when the unmanned vehicle travels along a traveling course provided within the course area, reconstitutes the traveling course from results of predicted of the interference, and guides the unmanned vehicle to travel along the reconstituted traveling course, comprising:
  means for inputting course data indicative of form of the course area;
  means for estimating error of a travel position when the unmanned vehicle travels along the traveling course; and means for predicting whether the interference of the unmanned vehicle occurs with the areas outside of the course area based on the course data and the estimated error of the travel positions;

wherein when an occurrence of the interference is predicted by the means of predicting interference, the traveling course is reconstituted.

2. The interference prediction apparatus for unmanned vehicles, according the claim 1, wherein the means for predicting interference comprises:

means for estimating a zone wherein the unmanned vehicle is located on the basis of the estimated error, the course data and the width of the unmanned vehicle; and means for determining that edge of the course area is within the zone in which the unmanned vehicle is located.

3. The interference prediction apparatus for unmanned vehicles, according to claim 1, wherein the means for predicting interference comprises:

means for establishing a zone within the course area where positions in the course data may not be present, on the basis of the estimated error, the course area, and the width of the unmanned vehicle; and means for determining that a position in the course data is present within the zone.

4. An interference prediction apparatus for unmanned vehicles, which predicts, when an unmanned vehicle travels along a traveling course provided within a course area, interference of the unmanned vehicle with areas outside of the course area or interference of the unmanned vehicle with another unmanned vehicle traveling along another traveling course provided along the traveling course; reconstitutes the traveling course from results of prediction of the interference; and guides the unmanned vehicle to travel along the reconstituted traveling course, comprising:

means for inputting course data indicative of form of the course area;

means for estimating error of a travel position when the unmanned vehicle travels along the traveling course, and error of a travel position when the another unmanned vehicle travels along the another traveling course; and means for predicting whether interference of the unmanned vehicle occurs with the areas outside of the course area based on the course data and the estimated error of the travel position of the unmanned vehicle, and whether interference of the unmanned vehicle occurs with the another unmanned vehicle based on each error estimated by the means for estimating error, wherein when an occurrence of the interference is predicted by the means of predicting interference, the traveling course of the unmanned vehicle is reconstituted.

5. The interference prediction apparatus for unmanned vehicles, according to claim 4, wherein the means for predicting interference comprises:

means for estimating respective zones in which the unmanned vehicles are located respectively based on each of the estimated errors, the course data of the one unmanned vehicle and the another unmanned vehicle, and the widths of the one unmanned vehicle and the another unmanned vehicle; and means for determining that the edge of the course area is within the zone in which the one unmanned vehicle is located and determining whether the respective zones interfere with each other.

6. The interference prediction apparatus for unmanned vehicles, according to claim 4, wherein the means for predicting interference comprises:

means for establishing respective zones within the course area where positions in the course data for the one unmanned vehicle may not be present, and where positions in the course data for the another unmanned vehicle may not be present, on the basis of each of the estimated errors, the course area, central position of the course area and the widths of the one unmanned vehicle and the another unmanned vehicle; and means for determining that corresponding positions in the course data are present within the respective zones.

7. The interference prediction apparatus for unmanned vehicles, according to claim 1 or 4, further comprising means for changing the course data to another course data with which interference can be avoided, when interference is predicted by the means for predicting interference.

8. The interference prediction apparatus for unmanned vehicles, according to claim 1 or 4, wherein the means for preparing course data comprises teaching type preparing means which records vehicle positions when an operator actually drives the unmanned vehicle.

9. An interference prediction apparatus for unmanned vehicles, which predicts, when an unmanned vehicle travels along a traveling course provided, interference of the unmanned vehicle with another unmanned vehicle traveling along another traveling course provided along the traveling course, reconstitutes the traveling course from results of prediction of the interference, and guides the unmanned vehicle so as to travel along the reconstituted traveling course, comprising:

means for estimating error of a travel position when the unmanned vehicle travels along the traveling course, and error of a travel position when the another unmanned vehicle travels along the another course; and means for predicting whether interference of the unmanned vehicle occurs with the another unmanned vehicle based on each error estimated by the means for estimating error, wherein when occurrence of the interference is predicted by the means of predicting interference, the traveling course of the unmanned vehicle is reconstituted.

* * * * *